(12) United States Patent
Nakata et al.

(10) Patent No.: US 7,373,063 B2
(45) Date of Patent: May 13, 2008

(54) OPTICAL WAVEGUIDE, OPTICAL WAVEGUIDE MODULE, AND A METHOD FOR FABRICATING OPTICAL WAVEGUIDE MODULE

(75) Inventors: Hidehiko Nakata, Kanagawa (JP);
Takahiro Arakida, Kanagawa (JP);
Terukazu Naruse, Kanagawa (JP);
Miwa Okubo, Kanagawa (JP);
Kazuyoshi Yamada, Tokyo (JP);
Momoko Eguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 137 days.

(21) Appl. No.: 11/305,836

(22) Filed: Dec. 16, 2005

(65) Prior Publication Data

US 2006/0140546 A1    Jun. 29, 2006

(30) Foreign Application Priority Data

Dec. 28, 2004 (JP) .......................... P2004-380401
Jul. 12, 2005 (JP) .......................... P2005-203417

(51) Int. Cl.
*G02B 6/10* (2006.01)

(52) U.S. Cl. .......................... 385/129; 385/31; 385/43; 385/50

(58) Field of Classification Search ................. 385/129
See application file for complete search history.

(56) References Cited

U.S. PATENT DOCUMENTS

| | | | | |
|---|---|---|---|---|
| 4,958,897 A | * | 9/1990 | Yanagawa et al. | ............ 385/50 |
| 7,289,702 B2 | * | 10/2007 | Takahashi et al. | ............ 385/50 |
| 2003/0118308 A1 | * | 6/2003 | Bricheno | ................... 385/129 |
| 2003/0156812 A1 | * | 8/2003 | Farah et al. | ................ 385/129 |

* cited by examiner

*Primary Examiner*—Frank G. Font
*Assistant Examiner*—Mary El-Shammaa
(74) *Attorney, Agent, or Firm*—Sonnenschein Nath & Rosenthal LLP (57) ABSTRACT

An optical waveguide module has a planar type optical waveguide having at least one core, an optical fiber for connecting with the core of the optical waveguide optically, and an optical element for connecting the core of the optical waveguide optically. The optical waveguide includes a groove for allowing an optical fiber to be inserted thereinto and aligning the optical fiber with the core to connect the optical fiber and the core optically. A first edge of the optical waveguide, which traverses the core, is tapered and an edge of the core, which is exposed in the first edge of the optical waveguide, is formed as a reflection surface. A planar type optical element is mounted as the optical element at a position that is opposite to the reflection surface to connect the planar type optical element with the core optically through the reflection surface.

2 Claims, 5 Drawing Sheets

OPTICAL WAVEGUIDE, OPTICAL WAVEGUIDE MODULE, AND A METHOD FOR FABRICATING OPTICAL WAVEGUIDE MODULE

CROSSREFERENCE TO RELATED APPLICATION

The present invention contains subject matter related to Japanese Patent Application JP2005-203417 filed in the Japanese Patent Office on Jul. 12, 2005, and Japanese Patent Application JP2004-380401 filed in the Japanese Patent Office on Dec. 28, 2004 the entire contents of which being incorporated herein by reference.

BACKGROUND OF THE INVENTION

1. Field of the Invention

The present invention relates to an optical waveguide, an optical waveguide module, and a method for fabricating the optical waveguide module. More particularly, it relates to a planar type optical waveguide having at least one core, an optical waveguide module having such the optical waveguide, and a method for fabricating such the optical waveguide module.

2. Description of Related Art

Although an electric signal has been used, in the past, in information communication between or among boards in electronic apparatus as well as chips therein, an optical wiring technology has been noticed and an optical waveguide module using such the optical wiring technology has been proposed in order to transmit a large amount of pieces of information (see Japanese Unexamined Patent Publication No. 2001-305365, for example).

The publication discloses an optical waveguide module including an edge-emitting type light-emitting element (laser diode (LD)) and an edge-receiving type light-receiving element (photodiode (PD)). The optical waveguide module has such a configuration that the light-receiving element is mounted in a mounting carrier that is arranged at a position away from the light-emitting element to align the light-receiving element with an optical waveguide.

Alternatively, an optical waveguide module in which an optical waveguide, light-emitting and -receiving elements and the like are mounted on a single mounting substrate has been proposed (see Japanese Unexamined Patent Publication No. 2000-047055, for example).

The publication discloses an optical waveguide module having a planar type optical waveguide and a substrate on which the optical waveguide, light-emitting and -receiving elements, and optical fibers are mounted. The substrate has V-grooves each for fitting the optical fiber therein and aligning it and makers each for alignment. Then, the optical waveguide and the light-emitting and -receiving elements are mounted so that they are aligned to each of the makers and the optical fibers are mounted so that they can be fitted to the V-grooves, thereby connecting each of the optical fibers, each of the optical waveguide, and the light-emitting and -receiving elements with each other.

SUMMARY OF THE INVENTION

However, a configuration of the optical waveguide module disclosed in the Japanese Unexamined Patent Publication No. 2001-305365 causes complexity in the mounting process, which prevents the costs therefor from being reduced.

In a configuration of the optical module disclosed in the Japanese Unexamined Patent Publication No. 2000-047055, it is necessary to align the optical waveguide with both of the light-emitting and -receiving elements mounted on the substrate and the V-groove(s) that is (are) a position (each) for fitting the optical fiber. This causes accuracy of parts to be set severe to bring them to a high fabrication cost thereof. If they are aligned to a high accuracy, mounting steps are complicated, thereby bringing them to a high mounting cost thereof.

Further, gap between the optical fiber and the optical waveguide and gaps between each of the light-emitting and -receiving elements and the optical waveguide can are fixed according to accuracy of a contour of the optical waveguide. Since the contour of the optical waveguide is so processed as to be fixed using dies, it is difficult for its accuracy to be achieved to an order of μm unite. It is thus difficult to control the gap between the optical fiber and the optical waveguide and the gaps between each of the light-emitting and -receiving elements and the optical waveguide to a high accuracy, which causes a loss.

Additionally, since thickness of adhesive used when the optical waveguide is adhered to the substrate may cause relative position of the optical waveguide and the optical fiber in a high direction thereof to be altered, it is necessary to control the thickness of adhered adhesive or the like to a high accuracy, thereby bringing the optical waveguide module to a high mounting cost.

Alternatively, a fabrication process of the planar type light-emitting and -receiving elements is made easier than that of the edge-emitting type ones and the planar type light-emitting and -receiving elements are available for surface mounting. Thus, the planar type light-emitting and -receiving elements have more advantage than the edge-emitting type ones in connection with high cost performance. Particularly, a planar type light-emitting element (vertical cavity-surface emitting laser (VCSEL)) has such an advantage that it is possible to be directly modulated at speed. It thus is significantly favorable to optical module device with high cost performance, and it is desirable to provide an optical module with high cost performance using the planar type light-emitting and -receiving elements.

In the configuration of each of the optical waveguide modules disclosed in the above Japanese publications, however, it is necessary to be provided with another mounting carrier or the like in order to displace VCSEL from the light-emitting element. This causes the mounting steps to be further complicated, thereby preventing the costs therefor from being reduced.

Thus, it is desirable to provide an optical waveguide, an optical waveguide module using the optical waveguide, and a method for fabricating the optical waveguide module in which planar type light-emitting and -receiving elements each having a simple configuration is available and whereby it is possible to align optical parts with each other to a high accuracy with facility.

According to an embodiment of the invention, there is provided a planar type optical waveguide having at least one core. The optical waveguide includes a groove for allowing an optical fiber to be inserted thereinto and aligning the optical fiber with the core to connect them optically. A first edge of the optical wave guide, which traverses the core, is tapered. An edge of the core, which is exposed in the first edge of the optical waveguide, is formed as a reflection surface.

In the embodiment of the planar type optical waveguide according to the invention, if the optical fiber is inserted into the groove, the optical fiber can be aligned with the core in the optical waveguide. The reflection surface of the core emits and receives light in a vertical direction with respect to the core.

In such a configuration that the groove is provided in the optical waveguide on a side of the core and the reflection surface is formed therein on the other side of the core, light propagated in the optical fiber is incident into the core, and propagated therein, and reflected by the reflection surface to be emitted in a vertical direction of the core. Light incident to the reflection surface in the vertical direction of the core is reflected with the reflection surface, propagated in the core, and incident to the optical fiber.

According to the embodiment of the planar type optical waveguide according to the invention, inserting the optical fiber into the groove allows optical alignment with the optical fiber to be attained, thereby realizing easy connection with the optical fiber.

Further, accuracy of the alignment with the optical fiber is fixed according to accuracy of the groove so that the alignment therewith can be realized to a high accuracy, thereby reducing necessary accuracy of a contour of the optical waveguide.

In this embodiment, the edge of the optical waveguide, which traverses the core, is tapered and the edge of the core, which is exposed in the tapered edge of the optical waveguide, is formed as a reflection surface. This allows the planar type optical element to be connected through the reflection surface.

Thus, it is possible to provide an optical waveguide, with low cost, by which excellent connection efficiency with the optical fiber can be realized and planar type light-emitting and -receiving elements can be used.

According to another embodiment of the invention, there is provided an optical waveguide module. The optical waveguide module has a planar type optical waveguide having at least one core, an optical fiber for connecting with the core of the optical waveguide optically, and an optical element for connecting with the core of the optical waveguide optically. The optical waveguide includes a groove for allowing an optical fiber to be inserted thereinto and aligning the optical fiber with the core to connect the optical fiber and the core optically. A first edge of the optical waveguide, which traverses the core, is tapered and an edge of the core, which is exposed in the first edge of the optical waveguide, is formed as a reflection surface. A planar type optical element is mounted as the optical element at a position that is opposite to the reflection surface to connect the planar type optical element with the core optically through the reflection surface.

According to the embodiment of the optical waveguide module according to the invention, inserting the optical fiber into the groove formed on the optical waveguide allows optical alignment of the core of the optical waveguide with the optical fiber to be attained. The reflection surface of the core of the optical waveguide realizes emission and reception of light along a vertical direction of the core.

In such a configuration that the groove is provided in the optical waveguide on a side of the core, the reflection surface is formed therein on the other side of the core, and the planar type optical element is mounted opposite to the reflection surface, if the planar type optical element is a light-emitting element, light incident to the reflection surface from the vertical direction of the core is reflected with the reflection surface, propagated in the core, and incident to the optical fiber.

If the planar type optical element is a light-receiving element, light propagated in the optical fiber is incident into the core, propagated therein, reflected by the reflection surface to emit it in a vertical direction of the core, and is receive by the light-receiving element.

According to the embodiment of the optical waveguide module according to the invention, the above-mentioned optical waveguide is provided so that connections of the optical waveguide with the optical fiber and with the planar type optical elements can be realized in passive alignment without driving the planar type optical elements.

Further, the groove for aligning the optical fiber is formed on the optical waveguide, so that accuracy of alignment of the optical waveguide with the optical fiber is not affected by accuracy of mounting position of the optical waveguide, thereby allowing the optical waveguide to be aligned with the optical fiber to a high accuracy if only the alignment of the optical waveguide with the planar type optical element is attained to a high accuracy, in a case of mounting the optical waveguide.

Thus, it is easily possible to align optical parts with each other to a high accuracy, thereby reducing the mounting costs and to realize the optical waveguide module with a high performance for a long time with low cast.

According to further embodiment of the invention, there is provided another optical waveguide module. The optical waveguide module has a planar type optical waveguide having at least one core and an optical fiber for connecting with the core of the optical waveguide optically. The optical waveguide includes a groove for allowing an optical fiber to be inserted thereinto and aligning the optical fiber with the core to connect the optical fiber and the core optically and a closing member for closing the groove by attaching it to the optical waveguide over an opening of the groove and fixing the optical fiber inserted into the groove. The closing member is made of material having a thermal expansion coefficient corresponding to a thermal expansion coefficient of material of which the optical waveguide is made.

According to the embodiment of this optical waveguide module according to the invention, inserting the optical fiber into the groove formed on the optical waveguide allows optical alignment of the core of the optical waveguide with the optical fiber to be attained. The optical fiber inserted into the groove is fixed by the closing member for closing the groove by attaching it to the optical waveguide over an opening of the groove.

The closing member is made of material having a thermal expansion coefficient corresponding to a thermal expansion coefficient of material of which the optical waveguide is made, so that even if temperature in the optical waveguide varies, the optical waveguide and the closing member expand and contract with each other by almost same amount thereof according to temperature variation, thereby hardly generating any stress at all in the optical waveguide.

According to additional embodiment of the invention, there is provided a method for fabricating an optical waveguide module. The method includes a step of mounting a planar type optical element on a mounting recess portion of a mounting substrate and performing electric connection thereon. The method also includes a step of aligning an optical waveguide with the mounting substrate to connect the planar type optical element optically and adhering and fixing the optical waveguide to the mounting substrate. The method further includes a step of aligning an optical fiber with a core of the optical waveguide by inserting the optical fiber into a groove for allowing the optical fiber to be inserted thereinto and aligning the optical fiber with the core and adhering and fixing the optical fiber.

In the embodiment of the method for fabricating the optical waveguide module according to the invention, after a step of performing electric connection on the planar type optical element has been finished, optical parts such as the optical waveguide are mounted. The optical waveguide is aligned with the planar type optical element and mounted and the groove for aligning and fixing the optical fiber is formed in the optical waveguide, so that it can be unnecessary to align the optical fiber with its fixed position.

After the optical waveguide has been adhered and fixed to the mounting substrate, the optical fiber is also inserted into the groove of the optical waveguide to be adhered and fixed. Alignment of the optical fiber with the optical waveguide can be attained by only inserting the optical fiber into the groove.

According to an embodiment of the method for fabricating the optical waveguide module, it is possible to mount the optical parts such as the optical waveguide after all the procedures of electric mounting have been finished. This allows electric parts to be mounted without having an influence of any thermal history that is necessary to the mounting of the electric parts upon the optical parts, thereby avoiding deteriorating the optical parts.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

DESCRIPTION OF THE INVENTION

Referring now to the drawings, preferred embodiments of an optical waveguide, an optical waveguide module, and a method for fabricating the optical waveguide module according to the invention will be described specifically below.

[A Configuration of a First Embodiment of an Optical Waveguide Module According to the Invention]

Figure 1A:
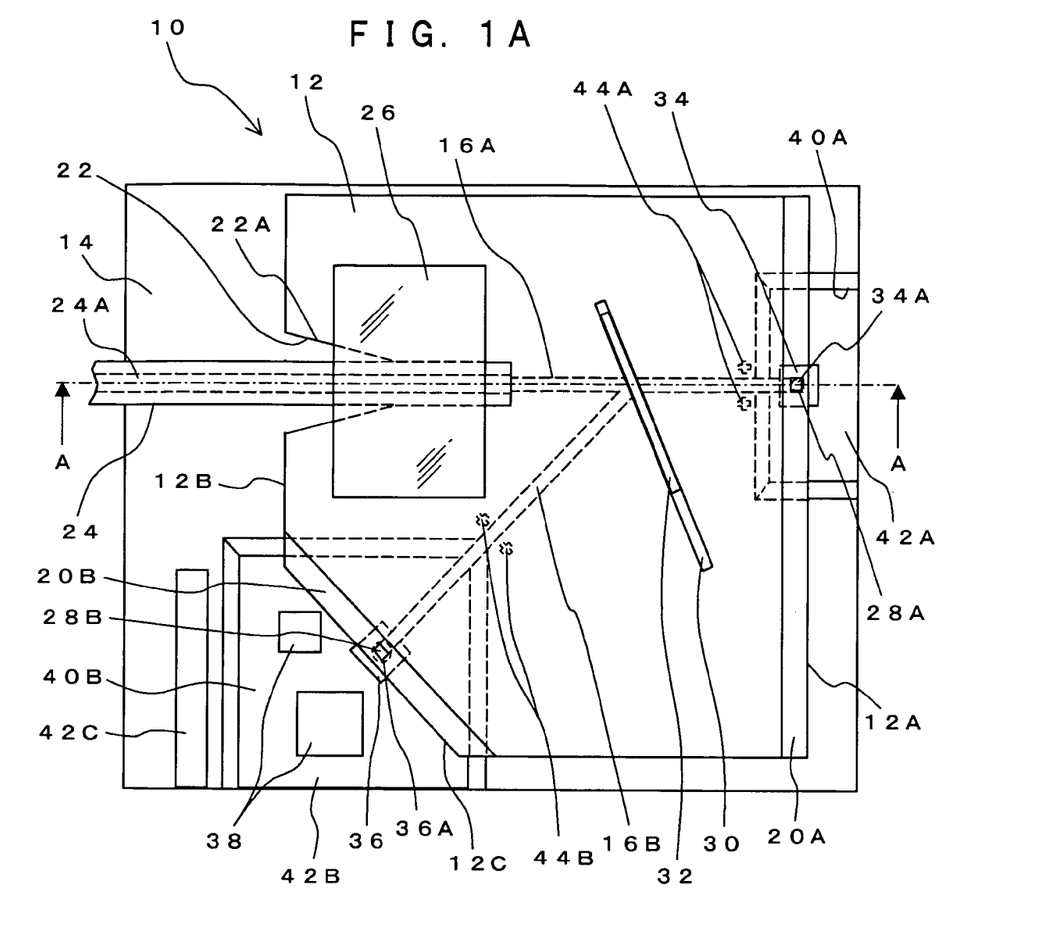
FIGS. 1A and 1B are diagrams each for showing a configuration of a first embodiment of an optical waveguide module according to the invention.
Figure 1B:
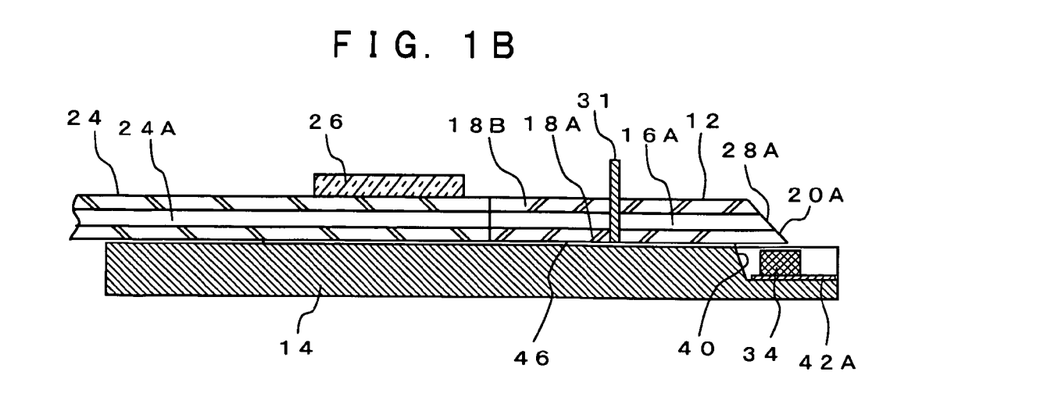

FIG. 1A is a plane view of an optical waveguide module as a first embodiment. FIG. 1B is a cross-sectional view taken along the line A-A in FIG. 1A.

The optical waveguide module 10 as the first embodiment has an optical waveguide sheet 12 constituting a planar type optical waveguide and a mounting substrate 14 for supporting the optical waveguide sheet 12. The optical waveguide sheet 12 is made of, for example, polymeric material. A first core 16A and a second core 16B as well as a lower clad 18A and an upper clad 18B constitute a core-clad structure.

The first core 16A and the second core 16B are configured so that their refractive indexes can be made slightly larger than those of the lower clad 18A and the upper clad 18B. Such a configuration permits light to be closed in the first core 16A and the second core 16B and to be propagated therein.

The optical waveguide sheet 12 has two opposite edges 12A and 12B. The edge 12A of the optical waveguide sheet 12, which traverses an edge of the first core 16A, is so tapered as to become a first tapered edge 20A. The optical waveguide sheet 12 has on its edge 12B a groove 22 for allowing an optical fiber 24 to be inserted thereinto and aligning the optical fiber 24 with the first core 16A. The first core 16A extends linearly in the optical waveguide sheet 12 from the edge 12A so that the other end of the first core 16A can be reached to the groove 22.

In the optical waveguide sheet 12, the second core 16B branches from the first core 16A and extends linearly. The optical waveguide sheet 12 also has an edge 12C, which traverse an end of the second core 16B. The edge 12C is so tapered as to become a second tapered edge 20B.

The groove 22 has such a form that the optical fiber 24 to be connected to the optical waveguide sheet 12 can be fitted therein and is so cut as to have an opening facing upwards. The groove 22 is cut in the optical waveguide sheet 12 from the edge 12B thereof in parallel with the first core 16A. The other end of the first core 16A exposes in a forward end of the groove 22.

The groove 22 is so formed as to become a rectangular shape, for example, if the optical waveguide sheet 12 is cross-sectioned, and a width thereof is so set as to have an amount thereof almost same as an outer diameter of the optical fiber 24. The groove 22 is also formed so that if the optical fiber 24 is fitted in the groove 22, a core 24A of the optical fiber 24 can align with the first core 16A in the optical waveguide sheet 12 as shown in FIG. 1A.

A depth of the groove 22 is so set as to have an amount thereof almost same as an outer diameter of the optical fiber 24. A thickness or the like of the lower clad 18A is set so that the core 24A of the optical fiber 24 can align with the first core 16A in the optical waveguide sheet 12 as shown in FIG. 1B when the optical fiber 24 is fitted in the groove 22.

Thus, if the optical fiber 24 is fitted in the groove 22 of the optical waveguide sheet 12, the core 24A of the optical fiber 24 can align with the first core 16A in the optical waveguide sheet 12 and an edge of the core 24A of the optical fiber 24 faces the other end of the first core 16A of the optical waveguide sheet 12.

It is to be noted that the groove 22 is so formed as to have a tapered portion 22A on a side of the edge 12B of the optical waveguide sheet 12 in order to allow the optical fiber 24 to be easily inserted thereinto.

The optical fiber 24 inserted into the groove 22 is held by a fiber-holding lid 26 and adhered and secured to the mounting substrate 14. The fiber-holding lid 26 is made of transparent material such as glass plate or acrylic plate and has such a dimension that it can close the opening relative to the groove 22. It is to be noted that in this embodiment, the fiber-holding lid 26 is mad of acrylic plate.

The first tapered edge 20A has an incline angle of 45 degrees with respect to a bottom surface of the optical waveguide sheet 12. The end of the first core 16A exposes in the same plane as that of the first tapered edge 20A. The end of the first core 16A exposed in the first tapered edge 20A is formed as a first reflection surface 28A.

Similarly, the second tapered edge 20B has an incline angle of 45 degrees with respect to the bottom surface of the optical waveguide sheet 12. The end of the second core 16B exposes in the same plane as that of the second tapered edge 20B. The end of the second core 16B exposed in the second tapered edge 20B is formed as a second reflection surface 28B.

In the optical waveguide sheet 12, an angle forming the edge 12B from which the groove 22 is formed and that is an extension of the first core 16A and the first core 16A stands 90 degrees. An angle forming the edge 12A on which the first tapered edge 20A that traverses the first core 16A is formed and the first core 16A stands 90 degrees.

An angle forming the edge 12C on which the second tapered edge 20B that traverses the second core 16B is formed and the second core 16B stands 90 degrees. A branch angle of the first and second cores 16a and 16B is sharply angled at, for example, 45 degrees. Thus, in this embodiment, the optical waveguide sheet 12 has a deformed pentagonal shape.

The optical waveguide sheet 12 has a slit 30 for allowing a filter 32 at a branch position of the first core 16A and the second core 16B. The filter 32 for selection of wavelength is inserted into the slit 30. The silt 30 is formed at a position that traverses the branch position of the first core 16A and the second core 16B. Both edges of the first and second cores 16A and 16B expose in one of the opposed side wall surfaces in the optical waveguide sheet 12, which form the slit 30, while an edge of the first core 16A exposes at the other side wall surface in the optical waveguide sheet 12, which also forms of the slit 30.

The filter 32 has a function to reflect or transmit light with an optional wavelength region selectively. For example, light of $\lambda 1$ can be reflected and light of $\lambda 2$ can be transmitted.

The filter 32 is inserted into the slit 30 and adhered and fixed to the optical waveguide sheet 12. The filter 32 is inserted into a position that traverses the branch position of the first core 16A and the second core 16B, so that its optical path can be changed according to wavelength of the light propagated in the first and second cores 16A and 16B.

The mounting substrate 14 is silicone (Si) substrate, for example, and mounts the optical waveguide sheet 12 on its surface. Planar type light-emitting element 34 such as VCSEL, planar type light-receiving element 36 such as PD, electronic parts 38 and the like are mounted on the mounting substrate 14.

In the mounting substrate 14, a first mounting recess portion 40A for mounting a planar type light-emitting element 34 with the light-emitting element 34 facing the first reflection surface 28A of the optical waveguide sheet 12 is provided. On the other hand, in the mounting substrate 14, a second mounting recess portion 40B for mounting a planar type light-receiving element 36 with the light-receiving element 36 facing the second reflection surface 28B of the optical waveguide sheet 12 is also provided.

The first and second mounting recess portions 40A and 40B are formed so that parts of a surface of the mounting substrate 14 can be recessed. An electrode pad 42A is provided on a bottom surface of the first mounting recess portion 40A. An electrode pad 42B is also provided on a bottom surface of the second mounting recess portion 40B.

Further, an electrode pad 42C, if any, can be provided in a position of the mounting substrate 14 other than the mounting recess portions.

The planar type light-emitting element 34 is mounted on the first mounting recess portion 40A with the light-emitting element 34 facing the first reflection surface 28A of the optical waveguide sheet 12 and is electrically connected with the electrode pad 42A. A bonding pad provided with upper surface of the planar type light-emitting element 34 is electrically connected with electronic parts, not shown, by wire bonding.

The planar type light-receiving element 36 is mounted on the second mounting recess portion 40B with the light-receiving element 36 facing the second reflection surface 28B of the optical waveguide sheet 12 and is electrically connected with the electrode pad 42B. A bonding pad provided with upper surface of the planar type light-receiving element 36 is electrically connected with electronic parts 38 and 38 or the like by wire bonding.

The mounting substrate 14 includes alignment markers 44A and 44A that indicate reference positions using when mounting the planar type light-emitting element 34 and alignment markers 44B and 44B that indicate reference positions using when mounting the planar type light-receiving element 36. These markers 44A, 44A, 44B, and 44B are formed on predetermined positions in a surface of the mounting substrate 14 using predetermined patterns.

The optical waveguide sheet 12 is adhered to the mounting substrate 14 by using adhesive 46 and secured thereto. The adhesive 46 is applied to whole back surface of the optical waveguide sheet 12 except for portions corresponding to the first and second mounting recess portions 40A and 40B of the mounting substrate 14.

[An Embodiment of Fabrication Steps of the Mounting Substrate]

Figure 2A:
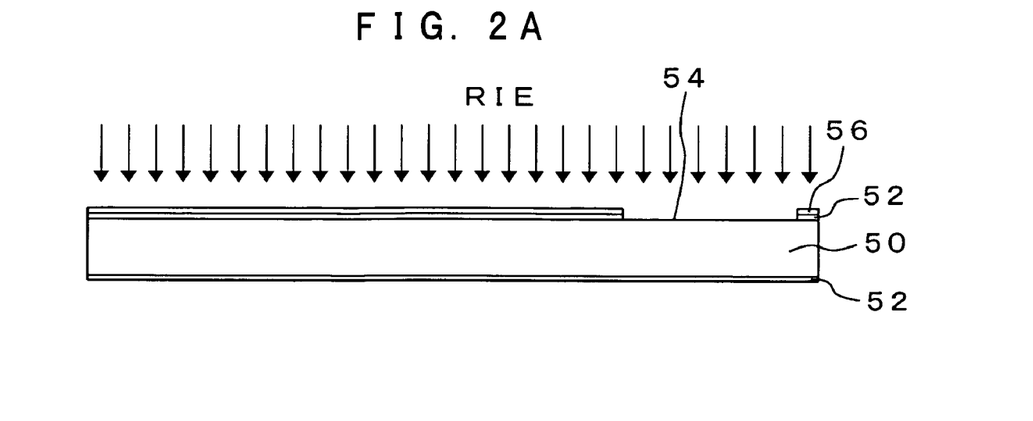
FIGS. 2A through 2C are diagrams each for illustrating fabrication steps of a mounting substrate.
Figure 2B:
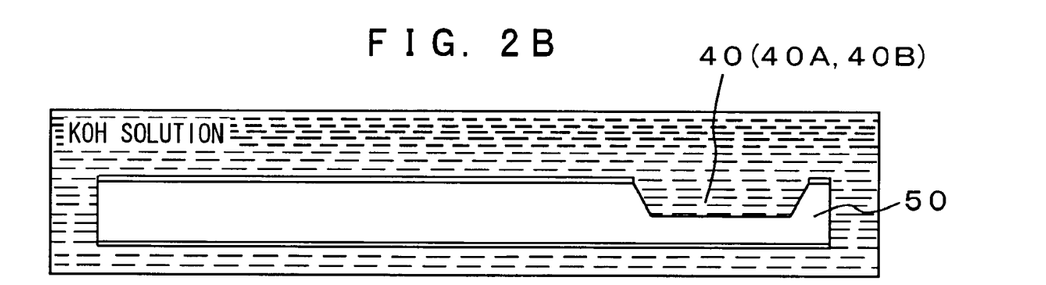
Figure 2C:
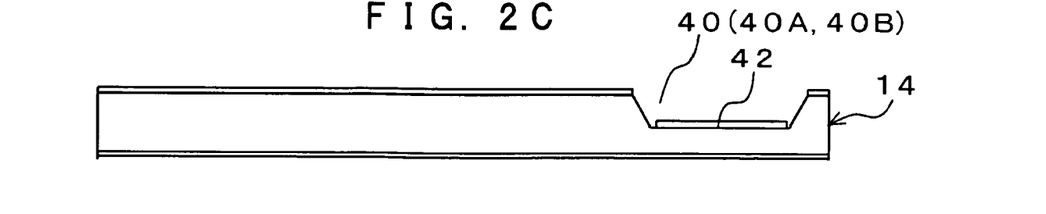

FIGS. 2A through 2C are explanatory diagrams each for showing an embodiment of fabrication steps of the mounting substrate 14. The following will describe an embodiment of the fabrication steps of the mounting substrate 14 constituting the first embodiment of an optical waveguide module 10 according to the invention.

As raw material to fabricate the mounting substrate 14, silicone substrate 50 having crystal orientation of 100 is used. To a surface of the silicone substrate 50, a thermally-oxidized film 52 is attached. Photoresist patters 56 having a predetermined opening 54 are coated on a surface of the silicone substrate 50, as shown in FIG. 2A, to make opened a position of the silicone substrate 50 that is used for fabricating the mounting recess portions 40A, 40B for mounting the planar type light-emitting element 34 and the planar type light-receiving element 36, as described in FIGS. 1A and 1B.

The thermally-oxidized film 52 is then deleted from the opened portion of the silicone substrate 50 by reactive ion etching (RIE) using fluoric gas. Masked photoresist patterns 56 also are deleted by ashing of oxygen plasma.

Next, as shown in FIG. 2B, the silicone substrate 50 is dipped into, for example, solution of KOH in the concentration of 20 wt % at temperature of 70° C., thereby etching silicone to fabricate the mounting recess portions 40A, 40B. In this etching process, alignment markers 44A, 44A, 44B, and 44B that indicate reference positions using when mounting the planar type light-emitting element 34 and the planar type light-receiving element 36 can be formed at the same instance.

In other words, patterning to form the alignment markers 44A, 44A, 44B, and 44B is performed at the same instance of the etching, so that recessed alignment markers 44A, 44A, 44B, and 44B maybe formed on the surface of the silicone substrate 50.

As shown in FIG. 2C, the electrode pads 42A and 42B are then formed on the bottom surfaces, respectively, of the mounting recess portions 40A and 40B according to predetermined patterns. In this embodiment, a configuration of the electrode pad 42 has three layers of titan (Ti), platinum (Pt), and gold (Au) from beneath. These metal films are formed using vapor deposition. For the patterning, lift-off step using photoresist is used.

As metal-film-forming method, coating and spattering can be used. As the patterning, etching can be used.

In this forming step of the electrode pads 42A and 42B, the alignment markers 44A, 44A, 44B, and 44B can be formed by metal patterning at the same instance.

If fabrication is performed in a situation of a wafer, dicing is finally performed to accomplish the mounting substrate 14 provided with the mounting recess portions 40A and 40B.

Thus, forming these alignment markers 44A, 44A, 44B, and 44B at the same instance in the forming step of the mounting recess portions 40A and 40B or the forming step of the electrode pads 42A and 42B allows these alignment markers 44A, 44A, 44B, and 44B to be formed on the mounting substrate 14 to a high accuracy.

[A Case of Fabrication Steps of a First Embodiment of the Optical Waveguide Sheet]

FIGS. 3A through 3H are explanatory diagrams each for showing an embodiment of fabrication steps of the optical waveguide sheet 12. The following will describe the fabrication steps of the optical waveguide sheet 12 constituting the first embodiment of an optical waveguide module 10 according to the invention.

Figure 3A:
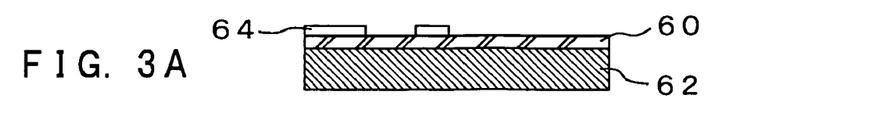
FIGS. 3A through 3H are diagrams each for illustrating fabrication steps of an optical waveguide sheet.

First, a thin film 60 for the lower clad 18A is formed by applying ultraviolet cure polymeric material constituting the lower clad 18A to a supporting substrate 62 made of silicon and the like using spin coat method or the like, as shown in FIG. 3A.

Next, ultraviolet is irradiated thereto through a mask 64 in which patterns of the groove 22 for aligning the optical fiber 24 and of the slit 30 for allowing the filter 32 to be inserted thereinto, shown in FIGS. 1A and 1B, are formed. The thin film 60 except for portions that will become the groove 22 and the slit 30 is then cured.

Figure 3B:
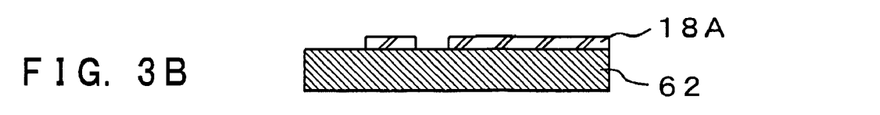

The portions that will become the groove 22 and the slit 30 are deleted therefrom by development in solution, for example, so that the lower clad 18A can be formed, as shown in FIG. 3B.

Figure 3C:
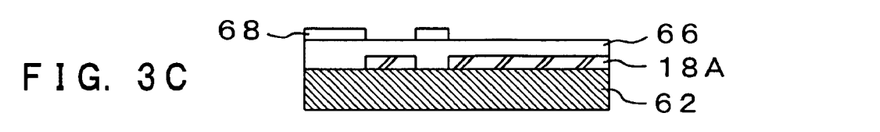

Next, a thin film 66 for the core 16A is formed by applying ultraviolet cure polymeric material constituting the first and second cores 16A and 16B to the lower clad 18A using spin coat method or the like, as shown in FIG. 3C.

Ultraviolet is then irradiated thereto through a mask 68 in which patterns of the first core 16A and the second core 16B as shown in FIGS. 1A and 1B are formed. Portions that will become the first core 16A and the second core 16B are then cured.

Figure 3D:
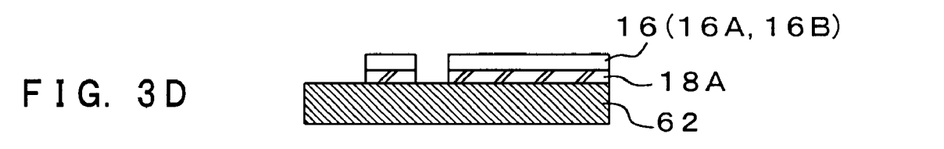

The thin film 66 except for portions that will become the first core 16A and the second core 16B is deleted therefrom by development in solution, so that the first core 16A and the second core 16B with a predetermined patters can be formed, as shown in FIG. 3D.

The polymeric material constituting the cores 16A and 16B has fraction index slightly more than that the polymeric material constituting the lower clad 18A and the upper clad 18B has.

Figure 3E:
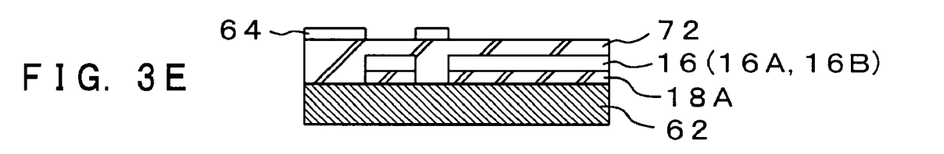

Next, a thin film 72 for the upper clad 18B is formed by applying ultraviolet cure polymeric material constituting the upper clad 18B to the lower clad 18A and the first and second cores 16A and 16B using spin coat method or the like, as shown in FIG. 3E.

Ultraviolet is then irradiated thereto through the mask 64 in which patterns of the groove 22 and the slit 30 are formed. The thin film 72 except for portions that will become the groove 22 and the slit 30 is then cured.

Figure 3F:
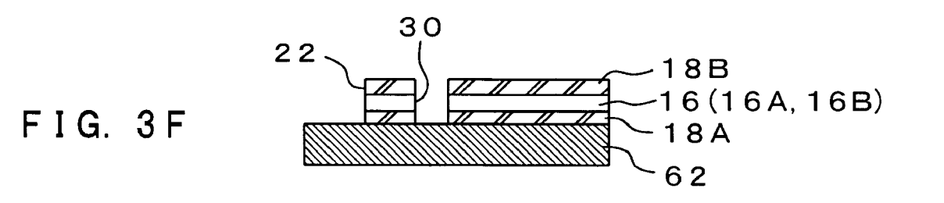

The portions that will become the groove 22 and the slit 30 are deleted therefrom by development in solution, so that the upper clad 18B can be formed, as shown in FIG. 3F.

Figure 3G:
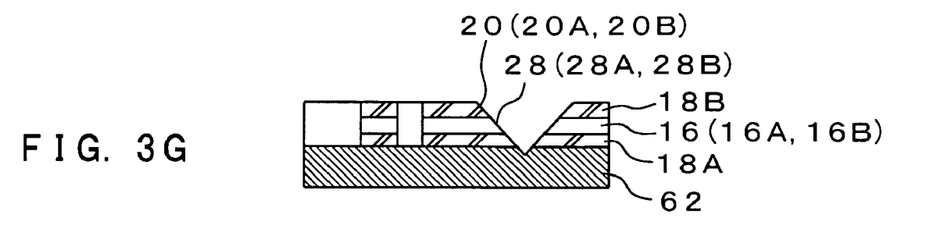

Next, the edges 12A and 12C of the optical waveguide sheet 12 in which the first and second tapered edges 20A and 20B will be formed are diced using a dicing blade having a dicing angle of 45 degrees to form the first and second tapered edges 20A and 20B and the first and second reflection surfaces 28A and 28B, as shown in FIG. 3G. Edges of the optical waveguide sheet 12 that other edges will be formed are diced using a dicing blade having a dicing angle of 90 degrees. Thus, the optical waveguide sheet 12 with a predetermined shape can be cut out.

Figure 3H:
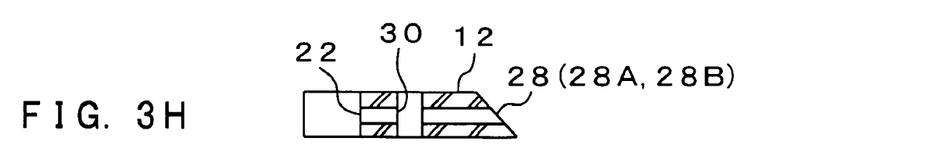

Finally, the optical waveguide sheet 12 is separated from the supporting substrate 62 as shown in FIG. 3H, so that the optical waveguide sheet 12 in which the groove 22 and the slit 30 are formed is completed.

[A Case of Fabrication Steps of a First Embodiment of the Optical Waveguide Module]

The planar type light-emitting element 34, the planar type light-receiving element 36 and the like are mounted on the mounting substrate 14 fabricated according to the fabrication steps illustrated in FIGS. 2A to 2C and the optical waveguide sheet 12 fabricated according to the fabrication steps illustrated in FIGS. 3A to 3H is also mounted on the mounting substrate 14, thereby forming the optical waveguide module 10 shown in FIGS. 1A and 1B.

FIGS. 4A through 4E are explanatory diagrams each for showing an embodiment of fabrication steps of the optical waveguide module 10. The following will describe the fabrication steps of a first embodiment of the optical waveguide module 10 according to the invention.

Figure 4A:
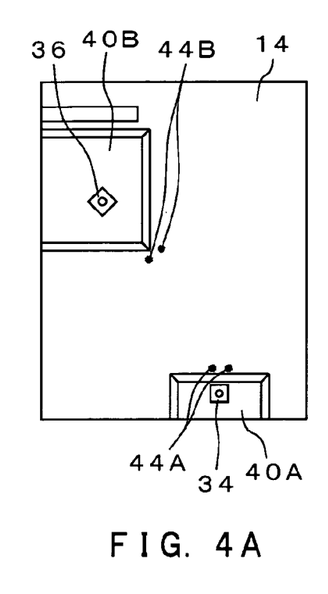
FIGS. 4A through 4E are diagrams each for illustrating fabrication steps of an optical waveguide module.

First, as shown in FIG. 4A, the planar type light-emitting element 34 is mounted in the first mounting recess portion 40A of the mounting substrate 14 using the alignment makers 44A and 44A as the reference positions. The planar type light-receiving element 36 is also mounted in the second mounting recess portion 40B of the mounting substrate 14 using the alignment makers 44B and 44B as the reference positions.

Figure 4B:
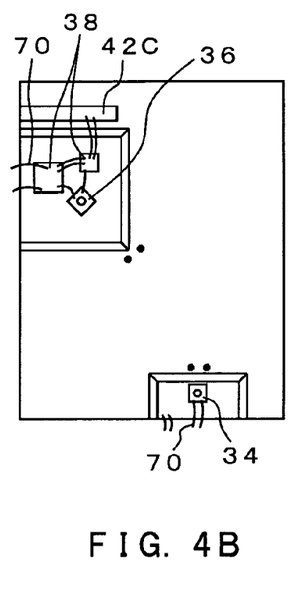

Next, electronic parts 38 and 38 such as a capacitor and TIA are mounted on the second mounting recess portion 40B as shown in FIG. 4B; and the electronic parts 38 and 38 are connected electrically using wire-bonding with bonding wires 70 after the mounting substrate 14 has been mounted on a circuit board, not shown.

Figure 4C:
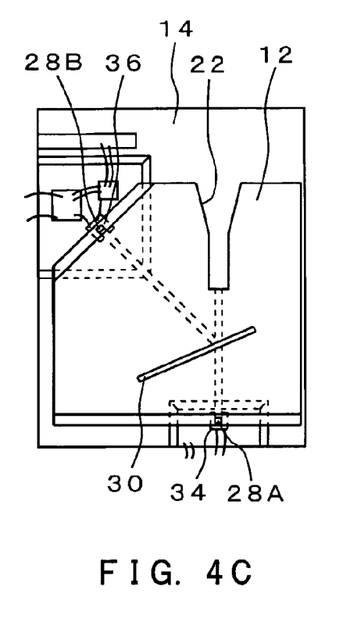

Next, the optical waveguide sheet 12 is adhered and secured to the mounting substrate 14 using a marker, not shown, for the planar type light-emitting element 34 so that the first reflection surface 28A of the optical waveguide sheet 12 can be arranged so as to be located just above a light-emitting portion 34A of the planar type light-emitting element 34 and the second reflection surface 28B thereof can be arranged so as to be located just above a light-receiving portion 36A of the planar type light-receiving element 36, as shown in FIG. 4C. As the adhesive 46 for adhering and securing the optical waveguide sheet 12 to the mounting substrate 14, visible light (405 nm or 436 nm) cure adhesive is used because light transmits the optical waveguide sheet 12.

Thus, the mounting steps of the optical waveguide sheet 12 are based on the planar type light-emitting element 34. This is because tolerance between the planar type light-emitting element 34 and the optical waveguide sheet 12 is strict more than that between the planar type light-receiving element 36 and the optical waveguide sheet 12. Alignment with the planar type light-emitting element 34 to a high accuracy allows excess loss to be reduced.

It is to be noted that a marker used as a reference position when mounting the optical waveguide sheet 12 may be provided on the mounting substrate 14.

Figure 4D:
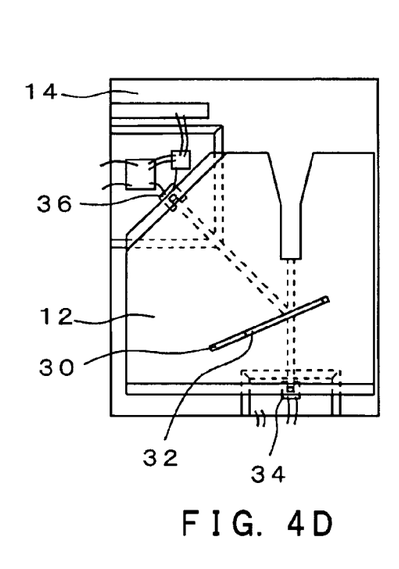

The filter 32 for selection of wavelength is then inserted into the slit 30 of the optical waveguide sheet 12 and adhered and secured thereto, as shown in FIG. 4D. As adhesive for adhering and securing the filter 32, visible light cure adhesive having a same refractive index as that of the optical waveguide sheet 12 is used.

Figure 4E:
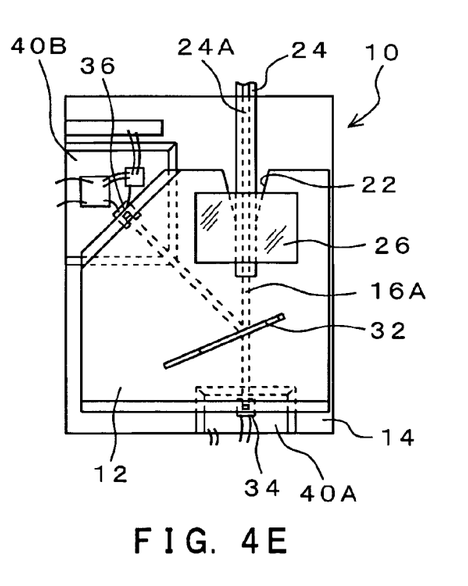

Finally, the optical fiber 24 is inserted into the groove 22 and held by the fiber-holding lid 26 from above and adhered and secured to the mounting substrate 14. As the adhesive for adhering and securing the optical fiber 24, visible light cure adhesive having a same refractive index as that of the optical waveguide sheet 12 is used.

Thus, assembling the optical waveguide module 10 in the fabrication step shown in FIGS. 4A through 4E allows the optical parts such as the optical waveguide sheet 12 to be mounted after all the electric parts have been mounted. This allows the optical parts to be mounted without adding to the optical parts any thermal history of high temperature by wire bonding and reflow that are necessary for mounting the electric parts.

Alignment of the optical waveguide sheet 12 with the planar type light-emitting element 34 and the planar type light-receiving element 36 can be realized in a two-dimensional direction so that if a maker is used, passive alignment can be realized without driving any optical element.

Further, as described above, thickness of the optical waveguide sheet 12 and a position, a width and the like of the groove 22 are set so that if the optical fiber 24 is inserted into the groove 22, the first core 16A of the optical waveguide sheet 12 aligns the core 24A of the optical fiber 24.

Since hardly any gap between side wall constituting the groove 22 and an outer circumferential surface of the optical fiber 24 can be generated if the optical fiber 24 is inserted into the groove 22, the optical fiber 22 is prevented from being moved in a radial direction thereof.

This allows the core 24A of the optical fiber 24 to be aligned with the first core 16A of the optical waveguide sheet 12 if the optical fiber 24 is inserted into the groove 22, thereby connecting the optical waveguide sheet 12 and the optical fiber 24 optically.

Thus, connecting the optical waveguide sheet 12 and the optical fiber 24 optically can be realized by passive alignment. Alternatively, accuracy on the width of the groove 22 formed by photolithography process stands an order of ± some μm. On the other hand, in the optical fiber 24 for multi-mode, an error of an order of ±10 μm in an optical connection thereof can be allowed. Therefore, when the groove is formed in the photolithography process, it is possible to get the alignment to a high accuracy.

Thus, alignment accuracy of the optical fiber 24 with the optical waveguide sheet 12 is dependent on accuracy of the groove 22 cut in the optical waveguide sheet 12, but not affected by any position accuracy between the optical waveguide sheet 12 and the planar type light-emitting element 34 or the planar type light-receiving element 36. This allows to be loosened accuracy that is necessary for a contour of the optical waveguide sheet 12.

In such a configuration that the first mounting recess portion 40A is formed in the mounting substrate 14 and the planar type light-emitting element 34 is mounted thereon while the second mounting recess portion 40B is formed in the mounting substrate 14 and the planar type light-receiving element 36 is mounted thereon and the optical waveguide sheet 12 is connected with the planar type light-emitting element 34 and the planar type light-receiving element 36, it is necessary for each of the mounting recess portions 40A and 40B to have such a depth that the planar type light-emitting element 34 and the planar type light-receiving element 36 cannot project from a plane surface of the mounting substrate 14.

Further, since, if a gap between the optical waveguide sheet 12 and the planar type light-emitting element 34 or the planar type light-receiving element 36 is made larger, connection efficiency of light is reduced, it is necessary to rigidly control the gap between the optical waveguide sheet 12 and the planar type light-emitting element 34 or the planar type light-receiving element 36.

Therefore, the mounting substrate 14 may be made of silicon board. Since using the silicon board as the mounting substrate 14 allows the mounting recess portions 40A and 40B to be easily formed to a high accuracy by anisotropic etching, it is possible to control the gap between the optical waveguide sheet 12 and the planar type light-emitting element 34 or the planar type light-receiving element 36 accurately, thereby resulting in a good optical connection.

By using light cure adhesive to adhere and secure the fiber-holding lid 26 to the optical waveguide sheet 12, it is possible to perform adhesion at a short time and without adding any thermal history to the optical waveguide sheet 12.

Namely, if using thermosetting adhesive to adhere and secure the fiber-holding lid 26, any heat treatment is necessary in the adhesion step so that any thermal history can be added to the optical waveguide sheet 12 made of polymeric material. If using native setting adhesive, it takes a large amount of time to set the adhesive, thereby resulting in low efficiency of its work.

On the other hand, by using transparent acrylic board that light transmits as the fiber-holding lid 26, it is possible to adhere and secure the fiber-holding lid 26 using, for example, visible light cure adhesive. This permits to be eliminated any influence of thermal history to the optical waveguide sheet 12 and the like. Setting the adhesive at a short time allows efficiency of work to be improved.

[Operations of the First Embodiment of the Optical Waveguide Module]

Into the optical waveguide module 10, an optical signal having a wavelength λ1 (for example, λ1=790 nm) from a corresponding apparatus, not shown, is input through the optical fiber 24. As described above, the optical fiber 24 is inserted into the groove 22 and secured to the optical waveguide sheet 12 so that the core 24A of the optical fiber 24 can be optically connected with the first core 16A of the optical waveguide sheet 12. Thus, the input optical signal propagated in the optical fiber 24 is incident to the first core 16A of the optical waveguide sheet 12 and propagated therein.

The input optical signal propagated in the first core 16A of the optical waveguide sheet 12 is incident to the filter 32 for selection of wavelength. The filter 32 reflects light having the wavelength λ1 in this embodiment. The input optical signal having the wavelength λ1, which is propagated in the first core 16A of the optical waveguide sheet 12, is reflected by the filter 32 and incident to the second core 16B. The input optical signal having the wavelength λ1 is then propagated in the second core 16B.

The input optical signal propagated in the second core 16B of the optical waveguide sheet 12 is then reflected by the second reflection surface 28B to convert its propagation direction to 90 degrees. The input optical signal thus reflected exits from a bottom surface of the second tapered edge 20B of the optical waveguide sheet 12. The receiving portion 36A of the planar type light-receiving element 36 then receives the input optical signal thus exited and the planar type light-receiving element 36 converts the input optical signal into a corresponding electric signal.

In the optical waveguide module 10, an electric signal is converted into a corresponding optical signal by the planar type light-emitting element 34. It is supposed that a wavelength of light emitted from the planar type light-emitting element 34 is λ2 (λ2=850 nm).

An output optical signal emitted from the planar type light-emitting element 34 is incident to a bottom surface of the first tapered edge 20A of the optical waveguide sheet 12. The first reflection surface 28A reflects it to convert its propagation direction to 90 degrees. The output optical signal thus reflected is propagated in the first core 16A of the optical waveguide sheet 12.

The output optical signal propagated in the first core 16A of the optical waveguide sheet 12 is then incident to the filter 32. Since the filter 32 transmits light having a wavelength of λ2 as described above, the output optical signal having a wavelength of λ2, which is propagated in the first core 16A, is transmitted through the filter 32 and incident to the first core 16A. The output optical signal is then propagated in the first core 16A. The output optical signal propagated in the first core 16A is incident to the optical fiber 24. The incident output optical signal is propagated in the optical fiber 24 and a corresponding apparatus, not shown, receives the output optical signal thus propagated.

If, in the corresponding apparatus, not shown, as an optical waveguide module paired with the optical waveguide module 10, the optical waveguide module has the same configuration as that of the optical waveguide module 10, a filter for selection of wavelength that reflects light having a wavelength of λ2 but transmits light having a wavelength of λ1, and a planar type light-emitting element for emitting light having a wavelength of λ1 is used, it is possible to perform separate multiplexing on an optical signal having separate wavelengths and propagate optical signals having separate wavelengths in a single optical fiber.

By providing such the optical waveguide module, it thus is possible to build a wavelength-division multiplexing two-directional optical communication such as wavelength-division multiplexing (WDM).

When the optical waveguide module 10 is operative, the planar type light-emitting element 34 operates so that the planar type light-emitting element 34 itself and a driver IC mounted on a circuit board, not shown, can generate heat, thereby resulting in rise in temperature of the optical waveguide sheet 12 affected by the heat.

In this embodiment, the optical waveguide sheet 12 is made of polymeric material, thermal expansion coefficient of which is about $80 \times 10^{-6}$ ppm/K.

If glass plate is used as the fiber-holding lid 26, thermal expansion coefficient of the optical waveguide sheet 12 is significantly different form that of the fiber-holding lid 26 because thermal expansion coefficient of glass is 0.4 to $10 \times 10^{-6}$ ppm/K. When temperature of the optical waveguide sheet 12 varies because of operation of the optical waveguide module 10, stress occurs in the optical waveguide sheet 12. Based on the stress in the optical waveguide sheet 12, an issue of separation of the optical waveguide sheet 12 from the mounting substrate 14 and the division of the optical waveguide sheet 12 into plural parts can occur.

Fortunately, in this embodiment, acrylic plate is used as the fiber-holding lid 26. Thermal expansion coefficient of acrylic is 70 to $100 \times 10^{-6}$ ppm/K, which is almost same as that ($80 \times 10^{-6}$ ppm/K) of the polymeric material of which the optical waveguide sheet 12 is made.

If, material having thermal expansion coefficient corresponding to the thermal expansion coefficient of polymeric material of which the optical waveguide sheet 12 is made is thus used as the fiber-holding lid 26 to be adhered and secured to the optical waveguide sheet 12, even when temperature of the optical waveguide sheet 12 varies based on the operation of the optical waveguide module 10, the optical waveguide sheet 12 and the fiber-holding lid 26 expand and contract at almost equal ratio of each of them according to temperature variation so that stress can be hardly generated in the optical waveguide sheet 12.

This avoids separating the optical waveguide sheet 12 from the mounting substrate 14 and dividing the optical waveguide sheet 12 thereinto. Thus, it is preferable to keep difference between thermal expansion coefficient of the thermal expansion coefficient made of the polymeric material and that of the fiber-holding lid 26 about $40 \times 10^{-6}$ ppm/K or less.

[A Configuration of a Second Embodiment of an Optical Waveguide Module According to the Invention]

Figure 5:
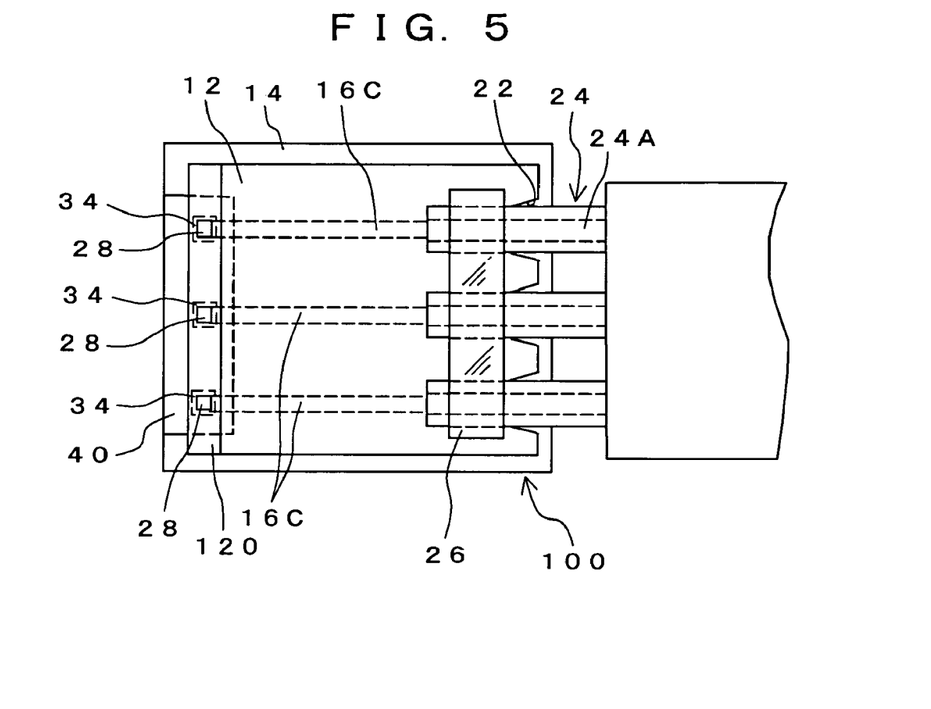
FIG. 5 is a diagram for showing a configuration of a second embodiment of an optical waveguide module according to the invention.

FIG. 5 is a plane view for showing a configuration of a second embodiment of an optical waveguide module according to the invention. In the following description, like reference numbers designate like or equivalent components of the first embodiment of the optical waveguide module 10.

The second embodiment of an optical waveguide module 100 has an optical waveguide sheet 12 and a mounting substrate 14. In this embodiment, three cores 16C are arranged in parallel on the optical waveguide sheet 12.

The optical waveguide sheet 12 has three grooves 22 each for aligning an optical fiber 24 on its one edge side. These grooves 22 correspond to these cores 16C.

The optical waveguide sheet 12 has a tapered edge 120 on the other edge opposed to the edge in which these grooves 22 are formed. An edge of each of the cores 16C exposed in the tapered edge 120 is configured as a reflection surface 28.

The mounting substrate 14 has a mounting recess portion 40 on its one edge. The mounting recess portion 40 mounts a planar type light-emitting element 34 or a planar type light-receiving element 36 on a position thereof opposite to the reflection surface 28 of the optical waveguide sheet 12 if the optical waveguide sheet 12 is adhered to the mounting substrate 14.

The optical fiber 24 is constituted of, for example, ribbon fiber. Each of the optical fibers 24 is inserted into the groove 22 formed on the optical waveguide sheet 12, hold by a fiber-holding lid 26 from above, and adhered and secured to the mounting substrate 14 by adhesive. It is to be noted that the fiber-holding lid 26 is made of transparent acrylic plate and adhered and secured to the optical waveguide sheet 12 by light cure adhesive. When each of the optical fibers 24 is inserted into the groove 22 and adhered and secured to the mounting substrate 14, each of the core 24A of the optical fiber 24 is aligned with the core 16C of the optical waveguide sheet 12 so that each of the optical fibers 24 can be optically connected with the optical waveguide sheet 12.

In this embodiment of an optical waveguide module 100, for example, three planar type light-emitting elements 34 are arranged to the cores 16C, respectively, to constitute transmission module with three channels. It is to be noted that if some planar type optical elements are so configured as to be the planar type light-receiving elements, this optical waveguide module 100 can function as a transmitting/receiving module utilizing multi-core fibers.

As described above, alignment accuracy of the optical fiber 24 to the optical waveguide sheet 12 depends on accuracy of the groove 22 formed in the optical waveguide sheet 12 but is not affected by position accuracy of the optical waveguide sheet 12 with any of the planar type light-emitting elements 34 or any of the planar type light-receiving elements 36. This allows to be loosened accuracy that is necessary for a contour of the optical waveguide sheet 12.

In this embodiment, the fiber-holding lid 26 for holding the optical fibers 24 to the optical waveguide sheet 12 is made of material having thermal expansion coefficient corresponding to the thermal expansion coefficient of polymeric material of which the optical waveguide sheet 12 is made. This prevents any stress from occurring in the optical waveguide sheet 12 even when the optical waveguide module 100 operates and temperature in the optical waveguide sheet 12 varies.

Therefore, this embodiment avoids separating the optical waveguide sheet 12 from the mounting substrate 14 and dividing the optical waveguide sheet 12 thereinto.

[A Configuration of a Second Embodiment of an Optical Waveguide Module According to the Invention]

Figure 6:
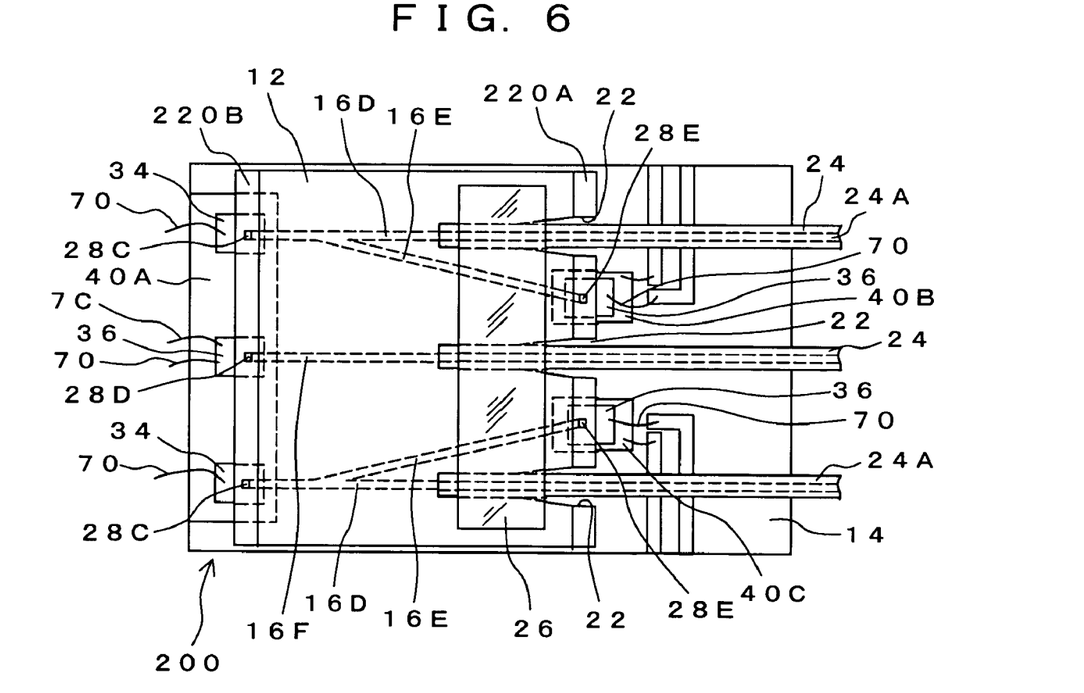
FIG. 6 is a diagram for showing a configuration of a third embodiment of an optical waveguide module according to the invention.

FIG. 6 is a plane view for showing a configuration of a third embodiment of an optical waveguide module according to the invention. In the following description, like reference numbers designate like or equivalent components of the first and second embodiments of the optical waveguide modules 10 and 100.

The third embodiment of an optical waveguide module 200 has an optical waveguide sheet 12 and a mounting substrate 14. In this embodiment, three cores are arranged in parallel on the optical waveguide sheet 12. Of the three cores, first cores 16D that are arranged on both right and left out sides of optical waveguide sheet 12 branch respectively branch cores 16E. Second core 16F, however, that is arranged on middle of the optical waveguide sheet 12 branches no branch core but is one core.

Each of the branch core 16E branches from the first core 16D and extends linearly. It then traverses an edge of the optical waveguide sheet 12, which is traversed with an end of each of the first and second cores 16D and 16F.

The optical waveguide sheet 12 has a first tapered edge 220A on an edge thereof that traverses an end of each of the branch cores 16E and 16E. The optical waveguide sheet 12 also has three grooves 22 each for aligning an optical fiber 24 on this edge. These grooves 22 extends form the first tapered edge 220A corresponding to the first and second cores 16D and 16F.

The optical waveguide sheet 12 has a second tapered edge 220B on the other edge thereof opposite to the edge in which the groove 22 is formed.

In the optical waveguide sheet 12, an edge of each of the first core 16D, which is exposed in the second tapered edge 220B, is configured as a reflection surface 28C. An edge of the second core 16F, which is exposed in the second tapered edge 220B, is configured as a reflection surface 28D. An edge of each of the branch core 16E, which is exposed in the first tapered edge 220A, is configured as a reflection surface 28E.

The mounting substrate 14 has a mounting recess portion 40A on its one side. The mounting recess portion 40A mounts planar type light-emitting elements 34 on positions thereof each opposite to the reflection surface 28C of the first core 16D if the optical waveguide sheet 12 is adhered to the mounting substrate 14. The mounting recess portion 40A also mounts a planar type light-receiving element 36 on a position thereof opposite to the reflection surface 28D of the second core 16F if the optical waveguide sheet 12 is adhered to the mounting substrate 14.

The mounting substrate 14 has mounting recess portions 40B and 40C on the other side. Each of the mounting recess portions 40B and 40C mounts a planar type light-receiving element 36 on a position thereof opposite to the reflection surface 28E of the branch core 16E if the optical waveguide sheet 12 is adhered to the mounting substrate 14.

The optical fiber 24 is constituted of, for example, ribbon fiber. Each of the optical fibers 24 is inserted into the groove 22 formed on the optical waveguide sheet 12, hold by a fiber-holding lid 26 from above, and adhered and secured to the mounting substrate 14 by adhesive. It is to be noted that the fiber-holding lid 26 is made of transparent acrylic plate and adhered and secured to the optical waveguide sheet 12 by light cure adhesive. When each of the optical fibers 24 is inserted into the groove 22 and adhered and secured to the mounting substrate 14, each of the core 24A of the optical fiber 24 is aligned with any of the first cores 16D and second core 16F of the optical waveguide sheet 12 so that each of the optical fibers 24 can be optically connected with the optical waveguide sheet 12.

The following describes operations of the third embodiment of the optical waveguide module 200.

Into the optical waveguide module 200, an optical signal from a corresponding apparatus, not shown, is input through the optical fiber 24 connected with the second core 16F. The input optical signal propagated in the optical fiber 24 is incident to the second core 16F of the optical waveguide sheet 12 and propagated therein.

The input optical signal propagated in the second core 16F of the optical waveguide sheet 12 is reflected by the reflection surface 28D to convert its propagation direction to 90 degrees. The input optical signal thus reflected exits from a bottom surface of the second tapered edge 220B of the optical waveguide sheet 12. The receiving portion 36A of the planar type light-receiving element 36 then receives the input optical signal thus exited and the planar type light-receiving element 36 converts the input optical signal into a corresponding electric signal.

In the optical waveguide module 200, an electric signal is converted into a corresponding optical signal by each of the planar type light-emitting elements 34. An output optical signal emitted from any of the planar type light-emitting elements 34 is incident to a bottom surface of the second tapered edge 220B of the optical waveguide sheet 12. Any of the reflection surfaces 28C reflects it to convert its propagation direction to 90 degrees. The output optical signal thus reflected is propagated in the first core 16D of the optical waveguide sheet 12.

The output optical signal propagated in the first core 16D of the optical waveguide sheet 12 is then incident to the optical fiber 24 and propagated therein. A corresponding apparatus, not shown, then receives the output optical signal thus propagated. A part of the output optical signal propagated in the first core 16D of the optical waveguide sheet 12 is branched into the branch core 16E and propagated therein.

The output optical signal propagated in the branch core 16E of the optical waveguide sheet 12 is reflected by the reflection surface 28E to convert its propagation direction to 90 degrees. The output optical signal thus reflected exits from a bottom surface of the first tapered edge 220A of the optical waveguide sheet 12. The receiving portion 36A of the planar type light-receiving element 36 then receives the output optical signal thus exited and the planar type light-receiving element 36 converts the output optical signal into a corresponding electric signal. This allows optical power or the like of the planar type light-emitting elements 34 to be monitored and its feed-back control to be performed.

In this embodiment of the optical waveguide module 200 as well, as described above, alignment accuracy of the optical fiber 24 to the optical waveguide sheet 12 depends on accuracy of the groove 22 formed in the optical waveguide sheet 12 but is not affected by position accuracy of the optical waveguide sheet 12 with any of the planar type light-emitting elements 34 or any of the planar type light-receiving elements 36. This allows to be loosened accuracy that is necessary for a contour of the optical waveguide sheet 12.

In this embodiment as well, the fiber-holding lid 26 for holding the optical fibers 24 is made of material having thermal expansion coefficient corresponding to the thermal expansion coefficient of polymeric material of which the optical waveguide sheet 12 is made. This prevents almost stress from occurring in the optical waveguide sheet 12 even when the optical waveguide module 100 operates and temperature in the optical waveguide sheet 12 varies.

Therefore, this embodiment also avoids separating the optical waveguide sheet 12 from the mounting substrate 14 and dividing the optical waveguide sheet 12 thereinto.

It is to be noted that a fabrication step of the optical waveguide module 200 is similar to that of the first embodiment of the optical waveguide module 10 as shown in FIGS. 4A through 4E except for lack of mounting step of the filter for selection of wavelength.

Although it has been described in the above embodiments that the contour of the optical waveguide sheet is pentagonal, the invention is not limited to this. The embodiments of the invention are applicable to any other polygonal contour of the optical waveguide sheet.

Thus, the embodiments of the invention are preferably applied to an optical communication module between or among the boards or chips in electronic apparatus, a connector utilizing optical fiber in a communication cable and the like.

It should be understood by those skilled in the art that various modifications, combinations, sub-combinations and alternations may occur depending on design requirements and other factors insofar as they are within the scope of the appended claims or the equivalents thereof.

What is claimed is:

1. An optical waveguide module comprising:
a planar type optical waveguide having at least one core;
an optical fiber for connecting with the core of the optical waveguide optically; and
an optical element for connecting with the core of the optical waveguide optically,
wherein,
the optical waveguide includes a groove for allowing an optical fiber to be inserted thereinto and aligning the optical fiber with the core to connect the optical fiber and the core optically,
a first edge of the optical waveguide is tapered, said first edge traversing the core, and an edge of the core is formed as a reflection surface, said edge being exposed in the first edge of the optical waveguide,
a planar type optical element is mounted as the optical element at a position that is opposite to the reflection surface to connect the planar type optical element with the core optically through the reflection surface,
the optical waveguide includes a filter for selection of wavelength, said filter allowing light with an optional wavelength region to be selectively reflected and transmitted and a optical path to be switched on the basis of wavelength of the light,
in the optical waveguide, at least one branch core branches from the core and the filter for selection of wavelength is arranged at a branch position of the core and the branch core,
a second edge of the optical waveguide is tapered, said second edge traversing the branch core, and a reflection surface of the branch core is formed in the second edge of the optical waveguide,
a planar type optical element is mounted opposite to the reflection surface of the core and a planar type optical element is mounted opposite to the reflection surface of the branch core, and
of the two planar type optical elements, one is a light-emitting element and the other is a light-receiving element.

2. An optical waveguide module comprising:
a planar type optical waveguide having at least one core;
an optical fiber for connecting with the core of the optical waveguide optically;
an optical element for connecting with the core of the optical waveguide optically; and
a closing member for closing the groove by attaching itself to the optical waveguide over an opening of the groove and fixing the optical fiber inserted into the groove, the closing member being made of material having a thermal expansion coefficient corresponding to a thermal expansion coefficient of material of which the optical waveguide is made,
wherein,
the optical waveguide includes a groove for allowing an optical fiber to be inserted thereinto and aligning the optical fiber with the core to connect the optical fiber and the core optically,
a first edge of the optical waveguide is tapered, said first edge traversing the core, and an edge of the core is formed as a reflection surface, said edge being exposed in the first edge of the optical waveguide,
a planar type optical element is mounted as the optical element at a position that is opposite to the reflection surface to connect the planar type optical element with the core optically through the reflection surface, and
the optical waveguide is made of polymeric material and the closing member is made of material having a difference of no more than $40 \times 10^{-6}$ ppm/K between its thermal expansion coefficient and that of the polymeric material of which the optical waveguide is made.

* * * * *